United States Patent
Wurmfeld et al.

(10) Patent No.: US 10,923,925 B2
(45) Date of Patent: Feb. 16, 2021

(54) SYSTEMS AND METHODS FOR HYBRID ENERGY HARVESTING FOR TRANSACTION CARDS

(71) Applicant: Capital One Services, LLC, McLean, VA (US)

(72) Inventors: David Wurmfeld, Falls Church, VA (US); Tyler Locke, Jersey City, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/783,777

(22) Filed: Feb. 6, 2020

(65) Prior Publication Data
US 2020/0177000 A1 Jun. 4, 2020

Related U.S. Application Data

(63) Continuation of application No. 16/201,372, filed on Nov. 27, 2018, now Pat. No. 10,601,232, which is a continuation of application No. 16/170,099, filed on Oct. 25, 2018, now Pat. No. 10,483,771.

(51) Int. Cl.
| | | |
|---|---|---|
| *G06K 19/07* | (2006.01) | |
| *H02J 7/00* | (2006.01) | |
| *H02J 50/10* | (2016.01) | |
| *H02J 50/12* | (2016.01) | |
| *H02J 7/02* | (2016.01) | |
| *H02J 7/34* | (2006.01) | |

(52) U.S. Cl.
CPC ........ *H02J 7/0027* (2013.01); *G06K 19/0704* (2013.01); *G06K 19/0709* (2013.01); *H02J 7/0013* (2013.01); *H02J 7/025* (2013.01); *H02J 50/10* (2016.02); *H02J 50/12* (2016.02); *H02J 7/345* (2013.01)

(58) Field of Classification Search
CPC ........ H02J 7/0027; H02J 7/0013; H02J 50/10; H02J 50/12; H02J 7/345; G06K 19/0704; G06K 19/0709; G07F 7/0846; G07F 7/0853; G06Q 20/3563; G06Q 20/3572; G06Q 20/341
See application file for complete search history.

(56) References Cited

U.S. PATENT DOCUMENTS

| | | | |
|---|---|---|---|
| 5,412,192 A * | 5/1995 | Hoss | G06K 19/06187 235/380 |
| 5,590,038 A | 12/1996 | Pitroda | |
| 5,684,382 A | 11/1997 | Fritz et al. | |
| 6,628,107 B1 | 9/2003 | Bang et al. | |

(Continued)

*Primary Examiner* — Seung H Lee
(74) *Attorney, Agent, or Firm* — Finnegan, Henderson, Farabow, Garrett & Dunner, LLP

(57) ABSTRACT

Systems and methods for hybrid energy harvesting for transaction cards are disclosed. Embodiments include a transaction card comprising a data storage device configured to supply account information to a transaction card terminal, a primary rechargeable power source to allow recharging and further to receive charging energy from the transaction card terminal during a transaction using the card, a secondary rechargeable power source configured to receive energy from the first rechargeable power source, and a power controller configured to control a flow of energy between the first and second rechargeable power sources.

19 Claims, 5 Drawing Sheets

(56) References Cited

U.S. PATENT DOCUMENTS

| | | |
|---|---|---|
| 7,681,232 B2 | 3/2010 | Nordentoft et al. |
| 9,711,970 B2 | 7/2017 | Masaoka |
| 9,727,813 B2 | 8/2017 | Mullen et al. |
| 2002/0074033 A1 | 6/2002 | Kular et al. |
| 2003/0019942 A1 | 1/2003 | Blossom |
| 2005/0006462 A1 | 1/2005 | Rouille et al. |
| 2009/0184167 A1 | 7/2009 | Faith et al. |
| 2013/0200165 A1 | 8/2013 | Downie et al. |
| 2013/0271265 A1 | 10/2013 | Finn |
| 2014/0062717 A1 | 3/2014 | Mudumbai et al. |
| 2014/0138449 A1 | 5/2014 | Goldman et al. |
| 2015/0220913 A1 | 8/2015 | Liu et al. |
| 2015/0269477 A1 | 9/2015 | Finn et al. |
| 2016/0004945 A1 | 1/2016 | Wade |
| 2016/0019449 A1 | 1/2016 | Auten et al. |
| 2016/0188919 A1 | 6/2016 | Gao et al. |
| 2017/0330173 A1 | 11/2017 | Woo et al. |

\* cited by examiner

SYSTEMS AND METHODS FOR HYBRID ENERGY HARVESTING FOR TRANSACTION CARDS

CROSS-REFERENCE TO RELATED APPLICATIONS

This application is a continuation of U.S. patent application Ser. No. 16/201,372, filed on Nov. 27, 2018 (pending), which is a continuation of U.S. patent application Ser. No. 16/170,099, filed on Oct. 25, 2018 (now U.S. Pat. No. 10,483,771). The aforementioned applications are incorporated herein by reference in their entirety.

TECHNICAL FIELD

The present disclosure relates generally to systems and methods for energy harvesting for transaction cards, and more particularly, to systems and methods for charging transaction cards through hybrid energy harvesting schemes.

BACKGROUND

Transaction cards, such as credit and debit cards, have increasingly become a primary means for customers to complete financial transactions. In parallel, advances in sensor technologies, embedded processing, and wireless connectivity have fueled the emergence of system-on-chip devices that can be implemented in daily use products. A "smart" transaction card hosts such system-on-chip devices to enable customers an enriched shopping and banking experience.

A smart card is capable of embedding information from more than one transaction card account into a single card. A potential advantage of a smart card is that if a user has more than one account, the user could carry a single smart card that digitally embeds information of multiple accounts of the same user, and allows for quick and easy access through navigation capabilities, thus simplifying management of the multiple accounts. Smart cards can also support multiple functionalities, such as, secure wireless pairing with smartphones, navigation capabilities, multi-factor authentication, and displays for easy visualization.

An important challenge for smart card manufacturers is addressing the high-power consumption requirements for seamless operation of the cards. Typically, smart cards use rechargeable batteries that have to be periodically recharged, or non-rechargeable batteries that have a finite lifespan, potentially causing unpredictable interruptions in their usage.

The disclosed systems and methods for hybrid energy harvesting for smart cards address one or more of the problems set forth above and/or other deficiencies in the prior art.

SUMMARY

One aspect of the present disclosure is directed to a transaction card comprising a data storage device configured to supply account information to a transaction card terminal, a first rechargeable power source configured to allow recharging and further to receive energy from the transaction card terminal during a transaction using the card, and a second rechargeable power source configured to receive energy from the first rechargeable power source. The transaction card may also comprise a power controller configured to control a flow of energy between the first and second rechargeable power sources. The transaction card may further comprise a user interface in electrical communication with the second rechargeable power source.

Another aspect of the present disclosure is directed to a transaction card comprising a data storage device, and a power module. The power module comprises a power receiver configured to receive charging energy from a transaction card terminal during a transaction, and a power supply unit. The power supply unit of the transaction card may comprise a first rechargeable power source configured to allow recharging and further to receive energy from the power receiver, a second rechargeable power source configured to receive energy from the first rechargeable power source, and a power controller configured to control a flow of energy between the first and second rechargeable power sources. The transaction card may also comprise a user interface in electrical communication with the power module.

In yet another aspect of the present disclosure, a method for managing power in a transaction card is disclosed. The method comprises receiving charging energy from a transaction card terminal during a transaction during a transaction involving transfer of data between the transaction card and the transaction card terminal, storing at least a portion of the received energy into a first rechargeable power source, charging a second rechargeable power source using at least a portion of the stored energy, and controlling, by a power controller, a flow of energy between the power receiver, the first rechargeable power source, and the second rechargeable power source, and wherein the second rechargeable power source is configured to supply electrical power to a user interface of the transaction card.

In some embodiments, the first rechargeable power source may receive charging energy upon interaction of the card with a transaction card terminal.

In some embodiments, the data storage device comprises one of a contact mode output component or a non-contact mode component.

In some embodiments, the first rechargeable power source may receive charging energy through at least one of electromagnetic induction, inductive coupling, or resonant inductive coupling.

In some embodiments, the second rechargeable power source may be configured to receive charging energy while the card is not being used for a transaction.

In some embodiments, at least one of the first or the second rechargeable power source of the transaction card may comprise an electrochemical capacitor.

In some embodiments, the first rechargeable power source may comprise at least one of an electric double-layer capacitor, a pseudo-capacitor, or a hybrid capacitor.

In some embodiments, the second rechargeable power source may comprise a lithium-ion battery, an alkaline battery, or a nickel-metal hydride battery.

In some embodiments, the power controller of the transaction card may be further configured to control a flow of charging energy between the transaction card terminal and the first rechargeable power source.

In some embodiments, the power controller may comprise a power management integrated circuit, a microprocessor, a power management unit, or an application-specific integrated circuit.

In some embodiments, the power receiver may be configured to receive charging energy upon interaction of the card with the transaction card terminal.

In some embodiments, the power receiver may be configured to receive charging energy through at least one of electromagnetic induction, inductive coupling, or resonant inductive coupling.

In some embodiments, the power controller is further configured to control a flow of charging energy between the power receiver, the first rechargeable power source, and the second rechargeable power source.

It is to be understood that both the foregoing summary and the following detailed description are exemplary and explanatory only and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
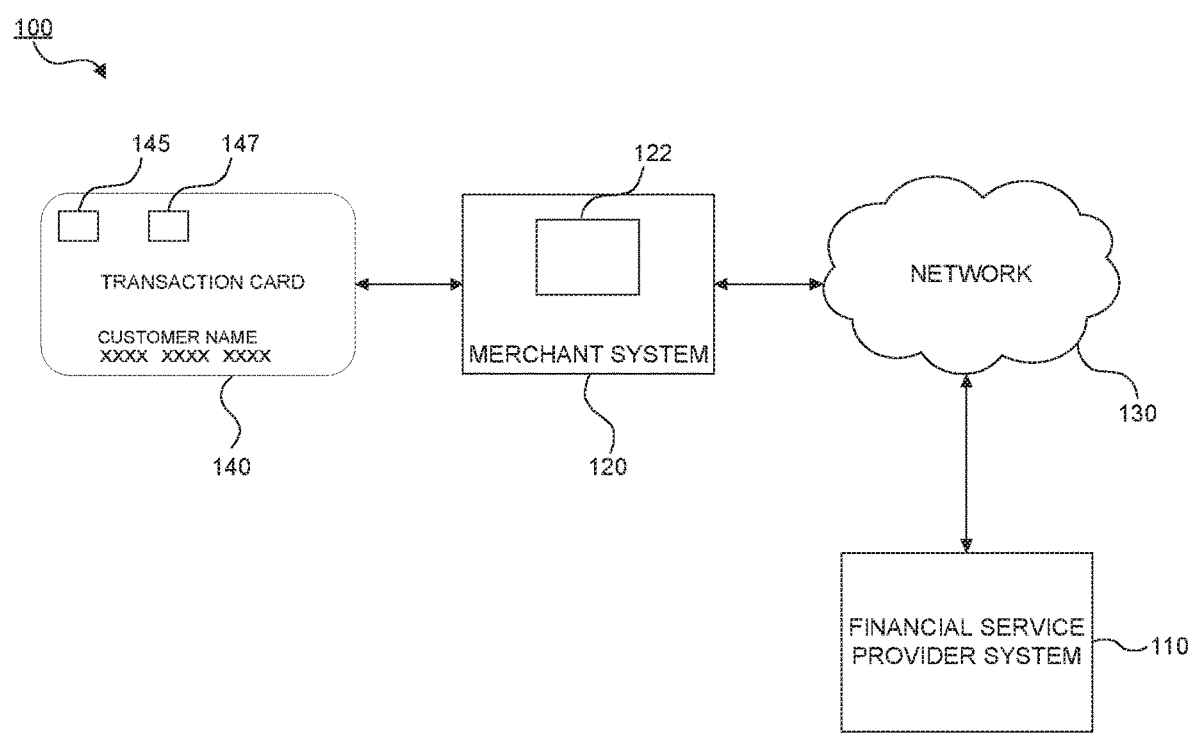
FIG. 1 is a block diagram of an exemplary transaction system, consistent with disclosed embodiments.

Hybrid energy harvesting, in the context of the present disclosure, refers to harnessing multiple sources of energy in a single unit. For example, as a first source, harvesting energy through electromagnetic induction between a transmitter in a transaction card terminal and a receiver in a transaction card to charge a primary rechargeable power source of the transaction card, combined with a conventional charge transfer from the supercapacitor to a secondary rechargeable power source, may supply adequate charge to power the transaction card and its components.

"Transaction card," as used herein, may refer to any physical card product that is configured to provide information, such as financial information (e.g., card numbers, account numbers, etc.), quasi-financial information (e.g., rewards balance, discount information, etc.) and/or individual-identifying information (e.g., name, address, etc.), to another device. Examples of transaction cards include credit cards, debit cards, gift cards, rewards cards, frequent flyer cards, merchant-specific cards, discount cards, identification cards, and driver's licenses, but are not limited thereto.

"Charging energy," as used herein, may refer to electrical energy required to power components of the transaction card, such as, for example, display components, security components, transaction components, communication and data storage components. A capacitor may receive charging energy by, for example, electromagnetic induction, non-radiative charging, radiative electromagnetic resonant charging, uncoupled radio-frequency (RF) charging, etc. Inductive charging and resonant charging both operate on the principle of inducing current in a loop of wire by a time-varying magnetic field. In practice, in resonant inductive charging or magnetic resonance, a magnetic loop antenna, such as, for example, a copper coil, is used to create an oscillating magnetic field, which can create a current in one or more receiver antennas. If the appropriate capacitance is added so that the loops resonate at the same frequency, the amount of induced current in the receivers increases. The dimensions of the coil may also affect the distance of power transfer between the transmitter and the receiver. The bigger the coil, or the more coils there are, the greater the distance over which charging energy may be supplied.

"Primary rechargeable power source," as used herein, may refer to a high-power density and low-energy density power source, allowing power to be absorbed rapidly from a harvesting source, such as, for example, a transaction card terminal, an automated teller machine (ATM), or a payment terminal.

"Secondary rechargeable power source," as used herein, may refer to a low-power density and high-energy density power source, allowing the second source to hold more energy overall and provide a longer battery life while being able to accept a nominal or slow trickle charge from the primary rechargeable power source. Reference will now be made in detail to the disclosed embodiments, examples of which are illustrated in the accompanying drawings.

FIG. 1 is a block diagram of an exemplary transaction system, consistent with disclosed embodiments. Transaction system 100 may be a computing system configured to receive and send information between the components of transaction system 100 and with components outside of transaction system 100. In some embodiments, transaction system 100 may include a transaction card 140 having a power module 145 and a data storage device, such as a transaction module 147, a financial service provider system 110, a merchant system 120, and a network 130. In some embodiments, transaction system 100 may include financial service provider system 110 and merchant system 120 connected by network 130. It should be appreciated, however, that transaction system 100 may include additional and/or alternative components.

Financial service provider system 110 may be one or more computer systems associated with an entity that provides financial services. For example, the entity may be a bank, a credit union, a credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and any other type of financial service account known to those skilled in the art. Financial service accounts may be associated with physical financial service transaction cards, such as a credit or debit cards that a user may carry on their person and use to perform financial service transactions, such as purchasing goods and/or services at a point of sale (POS) terminal. Financial service accounts may also be associated with electronic financial products and services, such as a digital wallet or similar account that may be used to perform electronic transactions, such as purchasing goods and/or services online. In some embodiments, financial service provider system 110 may be associated with an organization other than a financial institution, including a gift or reward card administrator, an airline or frequent flyer administrator, a merchant (which may in some embodiments be associated with merchant system 120), a government institution (e.g., an agency), or the like.

Merchant system 120 may be one or more computer systems associated with a merchant. For example, merchant system 120 may be associated with an entity that provides goods and/or services (e.g., a retail store). The merchant may include brick-and-mortar location(s) that a customer may physically visit and purchase goods and services. Such physical locations may include computing devices (e.g., merchant system 120) that perform financial service transactions with customers (e.g., transaction terminals, POS terminals, kiosks, etc.). Additionally, or alternatively, merchant system 120 may be associated with a merchant who provides electronic shopping mechanisms, such as a website or a similar online location that consumers may access using a computer through browser software, a mobile application, or similar software. Merchant system 120 may include a client device, such as a laptop computer, desktop computer, smart phone, or tablet, that a customer may operate to accesses the electronic shopping mechanism.

Network 130 may be any type of network that facilitates communications and data transfer between components of transaction system 100, such as, for example, financial service provider system 110 and merchant system 120. Network 130 may be a Local Area Network (LAN), a Wide Area Network (WAN), such as the Internet, and may be a single network or a combination of networks. Network 130 is not limited to the above examples and transaction system 100 may implement any type of network that allows the entities (shown and not shown) of transaction system 100 to exchange data and information.

Transaction system 100 may be configured to conduct a transaction associated with the use of a transaction card 140. In one example, financial service provider system 110 may provide transaction card 140 to a customer for use in conducting transactions associated with a financial service account held by the customer. In an example of one such transaction, the customer may use transaction card 140 at a merchant location to make a purchase. During the course of the purchase, information may be transferred from transaction card 140 to merchant system 120 (e.g., a point of sale device). Merchant system 120 may communicate with financial service provider system 110 via network 130 to complete the transaction. For example, merchant system 120 may receive account information from transaction card 140 by scanning a magnetic stripe on transaction card 140, receiving wireless data emitted by transaction module 147, or receiving data transmitted by direct physical connection with transaction module 147 embedded in transaction card 140. Merchant system 120 may transmit the account information and a purchase amount, among other transaction information, to financial service provider system 110. Financial service provider system 110 may settle the transaction by transferring funds from the customer's financial service account to a financial service account associated with the merchant.

Power module 145 may be any type of power management module that manages the power requirements of transaction card 140. Power module 145 may comprise, but is not limited to, a processor, a microprocessor, a very large scale integrated (VLSI) chip, an application specific integrated circuit (ASIC), a complex programmable logic device (CPLD), a field-programmable gate array (FPGA), a physical containment for power management components and electronic circuitry, etc. Power module 145 may also include components configured to perform various functions, for example, electronic power conversion, power control functions, battery charging, voltage scaling, power sequencing, power source selection. Power module 145 may also be configured to control the flow and direction of charging energy, for example, electrical power.

While transaction system 100 and transaction card 140 are depicted and described in relation to transactions that involve customers, merchants, and financial service providers, it should be understood that these entities are used only as an example to illustrate one environment in which transaction card 140 may be used. Moreover, it should be understood that transaction card 140 is not limited to financial products and may be any physical card product that is configured to provide information to another device. For example, transaction card 140 may be an identification card configured to provide information to a device in order to identify the holder of the card (e.g., driver's license) or provide information about the holder of the card (e.g., insurance card).

In an embodiment, transaction module 147 may include components such as electronic devices, magnetic devices, electromagnetic devices, data storage components, and/or other elements configured to receive, store, process, provide, transfer, transmit, conduct, send, delete, and/or generate information. For example, transaction module 147 may be a microchip (e.g., Europay Mastercard® Visa® (EMV) chip), a communication device (e.g., Near-Field Communication (NFC) device, Bluetooth® device, WiFi device), etc. In some embodiments, transaction module 147 may further include physical identification and/or security components, such as printed identification information (e.g., card number, customer name, customer signature, expiration date, security code, etc.), visual features (e.g., colors, designs, pictures, logos, etc.), and the like.

In some embodiments, though not illustrated in figures, transaction system 100 may include a near field communication (NFC) enabled device, for example, a mobile phone, a personal digital assistant, a blackberry device, a navigator, a music player, or the like. The NFC enabled device may comprise a processor, a memory, a computer program code or a software which may be stored in the memory. The software may include instructions for processor to control the operation of the NFC enabled device. In some embodiments, NFC may be used for pairing of transaction card 140 with the NFC enabled device associated with a user. The user may receive notifications and information related with transaction card 140 through a wireless protocol, for example, Bluetooth Classic, Bluetooth Low Energy (BLE), or the like.

Figure 2A:
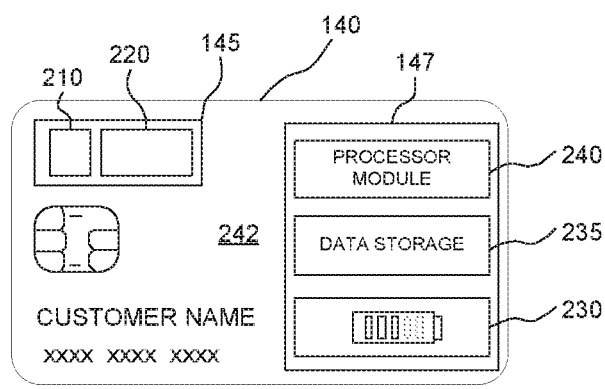
FIG. 2A illustrates a top view of an embodiment of transaction card, consistent with disclosed embodiments.
Figure 2B:
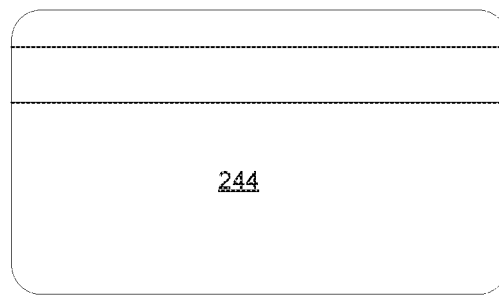
FIG. 2B illustrates a bottom view of the transaction card of FIG. 2A, consistent with disclosed embodiments

FIG. 2A illustrates a top view of transaction card 140 and FIG. 2B illustrates a bottom view of transaction card 140, consistent with disclosed embodiments. As illustrated in FIG. 2A, a front surface 242 of transaction card 140 may include, but is not limited to, power module 145, transaction module 147, logos/designs, security chip, identification information such as customer name, identification number, account information, etc. The physical properties of transaction card 140 (e.g., size, flexibility, location of various components included in the card) may meet the various international standards, including, for example, ISO/IEC 7810, ISO/IEC 7811, ISO/IEC 7812, ISO/IEC 7813, ISO/IEC 7816, ISO 8583, ISO/IEC 4909, and ISO/IEC 14443. For example, transaction card 140 may have a dimension of 85.60 mm (width) by 53.98 mm (height) by 0.76 mm (thickness), as specified in ISO/IEC 7810. It would be apparent to one of skill in the art that other dimensions and layouts of card components of transaction card 140 are possible as well. Referring to FIG. 2B, rear surface 244 of transaction card 140 may include, but is not limited to, magnetic stripe, emergency contact information, etc.

In some embodiments, transaction card 140 comprises power module 145 including a power receiver 210 and a power supply unit 220. Power receiver 210 and power supply unit 220 may communicate with each other wirelessly or through a wired connection. In some embodiments, the communication between power receiver 210 and power supply unit 220 may be unidirectional. For example, power supply unit 220 may control the flow of charging energy from power receiver 210 to power supply unit 220.

In some embodiments, power receiver 210 and power supply unit 220 may be disposed in close proximity to each other within power module 145 to enable wireless energy transfer. Power receiver 210 and power supply unit 220, both may be disposed on front surface 242 of transaction card 140, or both may be disposed on rear surface 244 of transaction card 140. Alternatively, power receiver 210 and power supply unit 220 may be disposed on opposite surfaces, for example, power receiver 210 may be disposed on front surface 242 and power supply unit 220 may be disposed on rear surface 244, or vice versa. In an embodiment where power receiver 210 and power supply unit 220 may be disposed on opposite surfaces, for example, front surface 242 and rear surface 244, wired or wireless communication may be possible. In some embodiments, power receiver 210 and power supply unit 220 may be disposed farther away from each other, either on the same surface or opposite surfaces. In some embodiments, power receiver 210 may be a separately controlled, independent receiver circuit communicating with power module 145 comprising power supply unit 220 (not shown).

In some embodiments, transaction module 147 may comprise a user interface 230, a data storage device 235, and a processor module 240, disposed on front surface 242, as illustrated in FIG. 2A. User interface 230 may comprise a lighted display including one or more of, but not limited to, light emitting diodes (LEDs), multi-segmented display, liquid crystal display (LCD), active matrix organic light emitting diodes (AMOLEDs), passive matrix light emitting diodes (PMLEDs), an audio player, an audio-visual unit, etc. Referring to FIG. 2A, user interface 230 indicates remaining battery charge of transaction card 140. Other indicators, such as, for example, remaining balance, chip failure, transaction status, unauthorized transactions, security breach, etc. may be displayed from transaction module 147 to a user via user interface 230.

User interface 230 may be configured to communicate with other components of transaction card 140, such as, for example, power module 145. In some embodiments, user interface 230 may receive data from one or more of merchant system 120, financial service provider system 110, network 130, etc. Transaction module 147 may comprise a communication module (not shown) configured to enable communication between components of transaction card 140, such as, for example, user interface 230, and external system components, for example, merchant system 120, financial service provider system 110, network 130, etc. For example, a user (e.g., a cardholder) may receive a visual notification via user interface 230 indicating remaining balance, communicated by the financial service provider system 110 through communication module. In some embodiments, the notification via user interface 230 may include, but not limited to, audio messages, audio-visual messages, haptic messages, etc. It would be apparent for a person with ordinary skill in the art to use other possible communication routes.

In some embodiments, user interface 230 may be configured to interactively communicate with a user. Interactive communication with the user may include receiving user input and/or providing feedback to the user. The user input may include direct interaction with user interface 230 or indirect interaction using an NFC enabled communication device, such as, for example, a mobile phone, a tablet, etc.

In some embodiments, the user feedback may be provided to the user in real-time. For example, user interface 230 may notify the user about a low-balance in an account during a transaction. In some embodiments, the notification may be displayed on user interface 230 or communicated to the user through a messaging system, such as, for example, an electronic mail, a short messaging service (SMS), or the like.

In some embodiments, transaction module 147 may comprise data storage device 235, such as, for example, a hardware-implemented database, a database, a server, a memory, etc. Data storage device 235 may be configured to store user account information, banking information, transaction history, etc. Data storage device 235 may comprise a database, a database server, a hardware-implemented database, an external drive, a dynamic random access memory (DRAM), a static random access memory (SRAM), a flash memory, an embedded multi-media controller (eMMC), an electrically erasable programmable read-only memory (EEPROM), etc.

Transaction module 147 may also comprise processor module 240. Processor module 240 may be configured to exchange transaction information with transaction card terminal and process user account information. In some embodiments, the user account information stored in data storage device 235 and transaction information may be authenticated to complete the transaction. Processor module 240 may comprise a computer, a microprocessor, a processing unit, an integrated circuit, an application specific integrated circuit (ASIC), or the like.

Figure 3:
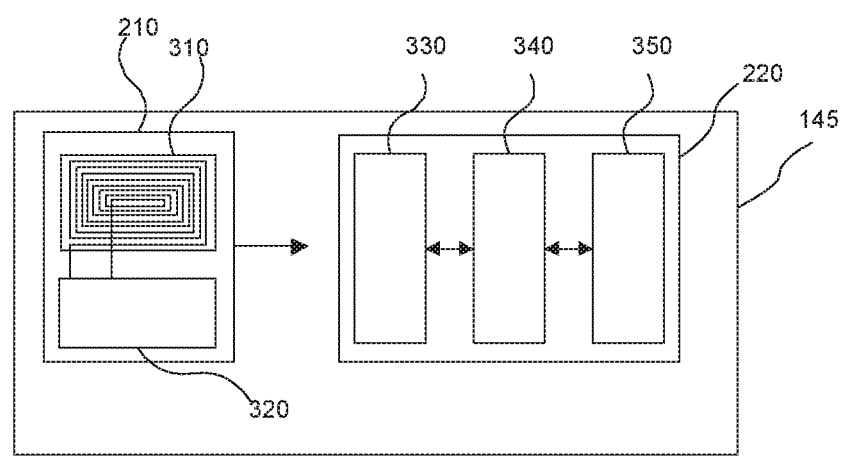
FIG. 3 is a block diagram of a power module of an embodiment of the transaction card of FIGS. 2A and 2B, consistent with disclosed embodiments.

FIG. 3 illustrates a block diagram of power module 145 comprising power receiver 210 and power supply unit 220. Power receiver 210 may include receiver coil 310 and rectifier circuit 320. Power supply unit 220 may include a primary rechargeable power source 330, power controller 340, and a secondary rechargeable power source 350.

In some embodiments, power receiver 210 may be configured to receive charging energy (in the form of electrical power) from a source, such as, for example, a transaction card terminal, an automated teller machine (ATM), or a payment terminal. Power receiver 210 may be configured to receive energy via a contact mode, that is, a physical interaction, with transaction card terminal, an ATM, or a payment terminal, by means of a contact mode component including, but not limited to, inserting chip reader terminals, sliding contacts in a slot, etc. In some embodiments, interaction of transaction card 140 with the transaction card terminal, or ATM, or payment terminal may be via a non-contact mode component, such as, for example, a Near-Field Communication (NFC) module, or other type of radio frequency module.

Power receiver 210 may comprise a receiver coil 310 and a rectifier circuit 320. Receiver coil 310 may comprise an antenna, a coil of metal such as copper, or a RF antenna. Receiver coil 310 may be configured to collect a signal from a terminal, such as a transaction card terminal or ATM, during a transaction. The signal may be a wireless signal such as an RF signal or inductive signal. Receiver coil 310 may comprise an antenna suitable for frequency band of interest including, but not limited to, 10 kHz to 500 kHz, 30 kHz to 300 kHz, 50 kHz to 200 kHz. For NFC, 13.56 kHz is a preferable target center frequency. Other frequency ranges may be possible as well. Receiver coil 310 may include a monopole, a dipole, a microstrip patch fabricated on a printed circuit board (PCB), or the like.

The incoming signal received by receiver coil 310 of power module 145 may be transferred to rectifier circuit 320 to convert the received signal to electrical energy. Rectifier circuit 320 may comprise impedance-matching circuitry, voltage doublers, voltage regulators, filters, rectifiers, field effect transistors, diodes, capacitors, etc.

In some embodiments, power supply unit 220 may include primary rechargeable power source 330, a power controller 340, and secondary rechargeable power source 350. Power supply unit 220 may communicate with power receiver 210 through a wired or a wireless connection. In some embodiments, power supply unit 220 may also communicate with other components such as, for example, security components, user interface 230, communication module, power controller, etc.

In some embodiments, primary rechargeable power source 330 may comprise a supercapacitor such as, for example, an electric double-layer capacitor (EDLC), hybrid capacitor, pseudo-capacitor, etc. Supercapacitors may be useful in applications requiring many rapid charging-discharging cycles, higher peak currents, low cost per cycle, reversibility, non-corrosive electrolyte, or low material toxicity. Electrical energy may be stored in supercapacitors via two storage principles: electrostatic double-layer capacitance and electrochemical pseudo-capacitance. In some embodiments, primary rechargeable power source 330 may comprise solid state batteries.

Supercapacitors may store electrical energy electrostatically at the interface of electrodes and electrolyte. The electrodes of an EDLC are preferably made of porous materials with high specific surface area, for example, but not limited to, activated carbon, carbon fiber cloth, carbide-derived carbon, carbon aerogel, graphene, carbon nanotubes, etc. The electrolyte of an EDLC may comprise a solvent including positively and negatively charged ions, making the electrolyte electrically conductive. The electrodes, namely anode and cathode, may be physically separated by a separator. The separator may comprise materials having good conductivity for ions but chemically inert at the same time, for example, nonwoven porous polymer films, polyacrylonitrile, woven glass fibers, porous woven ceramic fibers, etc.

In some embodiments, primary rechargeable power source 330 may be rapidly charged by incoming electrical signals from power receiver 210. The charging time of first rechargeable power source 330 may be 0.5 seconds or lower, 1 second or lower, 2 seconds or lower, 5 seconds or lower, 10 seconds or lower, 20 seconds or lower, 40 seconds or lower, 100 seconds or lower. In a preferred embodiment, the charging time of a supercapacitor may be in the range of 1 to 10 seconds. The charging time of primary rechargeable power source 330 may be significantly less compared to a conventional rechargeable battery, such as, for example, a lithium ion battery.

Some of the advantages of using a supercapacitor compared to a conventional rechargeable battery may be reduced charge time, enhanced charge-discharge cycles, high power density, reduced cost per energy unit, extended service life, fewer overcharging issues, self-limiting charging, and broader charge and discharge temperature ranges.

Referring to FIG. 3, power module 145 may include power controller 340. Power controller 340 comprises a power management integrated circuit (PMIC), power management unit (PMU), power management block, system-on-chip device, a microcontroller, or a microprocessor, or the like. Other suitable structures and device may be used to manage the flow and direction of electrical power within power module 145 and/or transaction card 140.

In some embodiments, power controller 340 may include power converters, rectifiers, cold-startup unit, and interface circuitry configured to regulate the incoming and outgoing power. For example, in energy harvesting systems such as, for example, transaction system 100, the voltage available from the source is typically fluctuating and a direct current-to-direct current (DC-DC) converter may be required to provide regulated voltage to other components of power module 145 or transaction card 140. The DC-DC converter may comprise diodes, capacitors, inductors, transformers, switched-mode DC to DC converters, etc. The interface circuitry may be configured to control the DC-DC converter to maximize power extraction from the energy harvester. This may be accomplished by designing the circuitry to present an equivalent load impedance to match the output impedance of the harvester. Other suitable techniques would be apparent to a skilled person in the art.

In some embodiments, power controller 340 may include a rectifier configured to rectify an incoming alternating current (AC) signal. The incoming AC signal may be rectified prior to being applied to the DC-DC converter. For example, if the energy harvesting source provides an AC input to the system, such as in the case of radio frequency (RF) power from a payment terminal, an additional rectification of the incoming wave signal may be performed prior to being applied to a DC-DC converter. Other suitable forms of AC inputs such as vibration energy may be used as well.

In some embodiments, transaction module 147 may consume static power, such as, for example, power consumed during powering up, or in an idle state when it is not harvesting energy. The static power may utilize the stored energy and may drain the charge of power sources if transaction card 140 is unused over extended periods of time. In some embodiments, power controller 340 may include a cold-startup unit configured to allow power module 145 to boot-up with zero or minimum initial energy stored.

In some embodiments, power controller 340 may include memory components, memory blocks, multiplexers, logic gates, clock generators, etc. for performing functions associated with disclosed embodiments. In some embodiments, power controller 340 may include programmable memory, such as, for example, One Time Programmable (OTP) memory to store a configuration for providing and managing power to transaction card 140 and other components.

In some embodiments, secondary rechargeable power source 350 may comprise a rechargeable lithium-ion battery, an alkaline battery, a nickel-metal hydride battery, or a lead-acid battery. Secondary rechargeable power source 350 may include a metal-oxide positive electrode (anode) that is coated onto an aluminum current collector, a negative electrode (cathode) made from carbon/graphite coated on a copper current collector, a separator, and an electrolyte made of lithium salt in an organic solvent.

In some embodiments, secondary rechargeable power source 350 may be configured to deliver large amounts of current to operate components of transaction module 147 and/or power module 145. For example, power stored in secondary rechargeable power source 350 may be utilized to operate user interface 230, power supply unit 220, etc. In some embodiments, power stored in secondary rechargeable power source 350 may be partitioned such that power allocations are possible based on the power requirements of transaction module 147. For example, during a transaction more power may be required to operate the components associated with communicating with a network 130 or financial service provider system 110. In some embodiments, power supply unit 220 may comprise more than one secondary rechargeable power source 350 (not shown) configured to provide back-up power, as needed.

In some embodiments, secondary rechargeable power source 350 may be configured to receive charging energy from primary rechargeable power source 330 during a transaction using transaction card 140. Power controller 340 may regulate the flow of charging energy from primary rechargeable power source 330 to secondary rechargeable power source 350, as needed. In some embodiments, secondary rechargeable power source 350 may receive charging energy from primary rechargeable power source 330 when transaction card 140 is not being used for a transaction.

In some embodiments, power controller 340 may be configured to determine whether secondary rechargeable power source 350 needs to be recharged, and power controller 340 may be configured to control the flow of charging energy from the primary rechargeable power source 330 to secondary rechargeable power source 350 based on the determination. In some embodiments, power controller 340 may also be configured to communicate information regarding the amount of stored energy in primary and/or secondary rechargeable power source to the user through NFC enabled device associated with the user. The information may be communicated through network 130 or other communication means.

Figure 4:
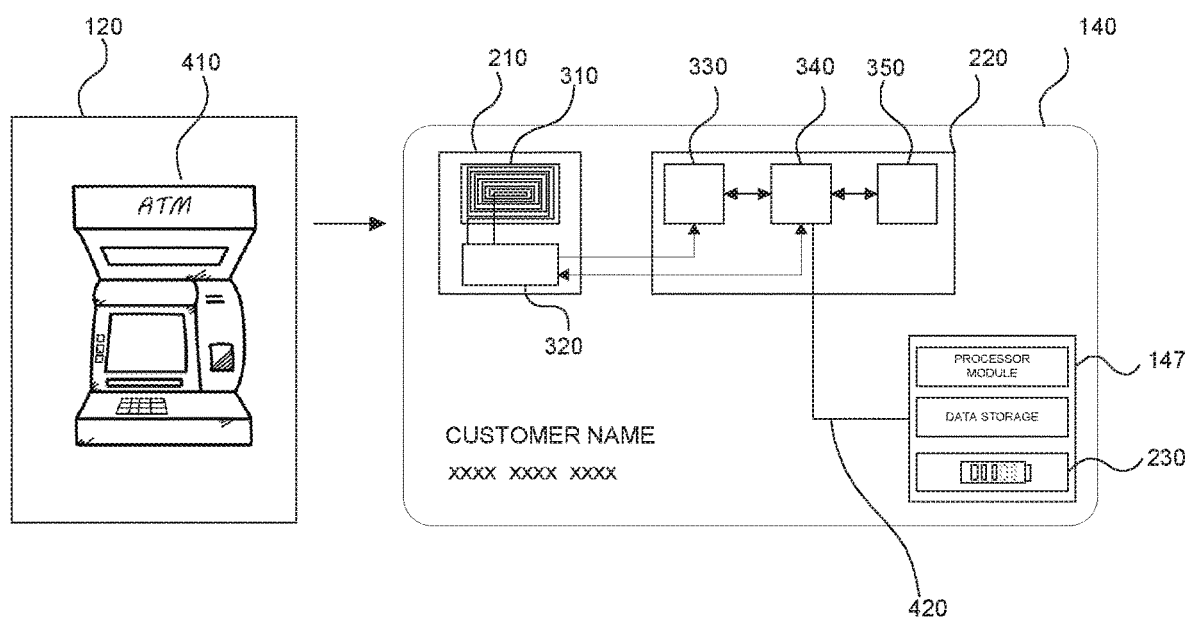
FIG. 4 is a block diagram illustrating an exemplary energy harvesting scheme for the transaction card, consistent with disclosed embodiments.

FIG. 4 illustrates an example of energy harvesting scheme for transaction card 140. Merchant system 120 may comprise an ATM 410. Power receiver 210 of transaction card 140 may receive charging energy from ATM 410 during a contact mode transaction with ATM 410. For example, transaction card 140 may receive charging energy from ATM 410 when customer inserts transaction card 140 in ATM 410 for performing a financial transaction, such as, for example, cash withdrawal, check deposit, bank balance, etc.

In some embodiments, transaction card 140 may receive charging energy through a non-contact interaction mode with ATM 410 through, for example, electromagnetic inductive charging. ATM 410 may comprise a component configured to transmit signals. Receiver coil 310 of power receiver 210 may receive the transmitted signals from ATM 410 and supply charging energy to primary rechargeable power source 330 of power supply unit 220.

In some embodiments, the user may receive notification on an NFC enabled device during a transaction using transaction card 140 from ATM 410 through a wireless protocol, for example, Bluetooth Classic, Bluetooth Low Energy (BLE), or the like. In some embodiments, the notification may include instructions for the user to allow the transaction card to remain inserted for a period of time sufficient to allow charging of primary and/or secondary rechargeable power source. The notification may comprise visual, audio, haptic, audio-visual messaging, or combinations thereof. Other notification methods may be used as well.

In some embodiments, power controller 340 may be configured to determine whether a transaction card 140 has been unused for an extended period of time. Based on this determination, power controller 340 may then force power module 145 into a power-saving mode to extend battery life.

In some embodiments, power module 145 and transaction module 147 may be in communication with each other. Power module 145 may determine whether transaction module 147 requires additional power to perform a transaction successfully. In some embodiments, power module 145 may comprise an algorithm, such as, a machine learning algorithm, a software implemented algorithm, etc. to determine whether the stored energy in primary rechargeable power source 330 and/or secondary rechargeable power source 350 is sufficiently charged for successfully completing a transaction using transaction card 140. Upon determining that the stored energy is sufficient, power controller 340 of power module 145 may supply power to transaction module 147.

In some embodiments, transaction module 147 may communicate power requirements for its components to power module 145. For example, user interface 230 of transaction module 147 may communicate directly or indirectly with power module 145. Upon receiving the communication and determining whether additional power is required, power module 145 may communicate supply power to user interface 230 of transaction module 147.

In some embodiments, power module 145 may determine whether the combined stored energy in primary and secondary rechargeable power source 350 is insufficient and below a pre-determined threshold level, power module 145 may notify the user through a visual, audio-visual, audio, or haptic feedback, or combinations thereof, through user interface 230. Determining whether the combined stored energy is sufficient may be performed through a self-executed algorithm. In some embodiments, the algorithm may be executed based on a request or communication from transaction module 147.

In some embodiments, user interface 230 may be configured to display the status information of power module 145 and transaction module 147. User interface 230 may be programmable to display information based on user input. For example, user may request status information of power module 145 and/or transaction module 147 directly or indirectly through a NFC enabled mobile device. In some embodiments, user interface 230 may be programmed to display status information at a pre-determined time, or at regular intervals, etc.

In some embodiments, primary rechargeable power source 330 may be charged rapidly by receiving charging energy from power receiver 210. The received charging energy may then be delivered to secondary rechargeable power source 350, regulated by power controller 340. In some embodiments, output current from secondary rechargeable power source 350 may be delivered through an electrical connection 420 to operate transaction module 147 (not shown in figures).

In some embodiments, electrical connection 420 connects power controller 340 to transaction module 147, as illustrated in FIG. 4. In such a configuration, power controller 340 may electrically "disconnect" secondary rechargeable power source 350 from power module 145 and transaction module 147, when there is insufficient energy in primary rechargeable power source 330 and/or secondary rechargeable power source 350. Electrically disconnecting secondary rechargeable power source 350 from power module 145 and transaction module 147 may prevent damage to power source 350.

In some embodiments, the flow of energy between power controller 340 and secondary rechargeable power source 350 may be bidirectional, as illustrated in FIG. 4, for example, power controller 340 may supply energy directly to secondary rechargeable power source 350 during a charging cycle, or power controller 340 may receive energy from secondary rechargeable power source 350 and deliver energy to transaction module 147 for normal operation, when charging is not occurring.

In some embodiments, when there is sufficient energy being supplied from power receiver 210 and/or primary rechargeable power source 330, electrical connection 420 allows power controller 340 to individually charge secondary rechargeable power source 350, while using the surplus energy to supply transaction module 147 during the transaction ensuring that none of the energy from secondary rechargeable power source 350 is wasted.

In some embodiments, when secondary rechargeable power source 350 does not require charging, power controller 340 may supply the energy from power receiver 210 and/or primary rechargeable power source 330 directly to transaction module 147 for the duration of the transaction.

In some embodiments, electrical connection 420 may comprise wires, circuit board traces, or internal IC connections. Other suitable connection methods may be used as well.

Figure 5:
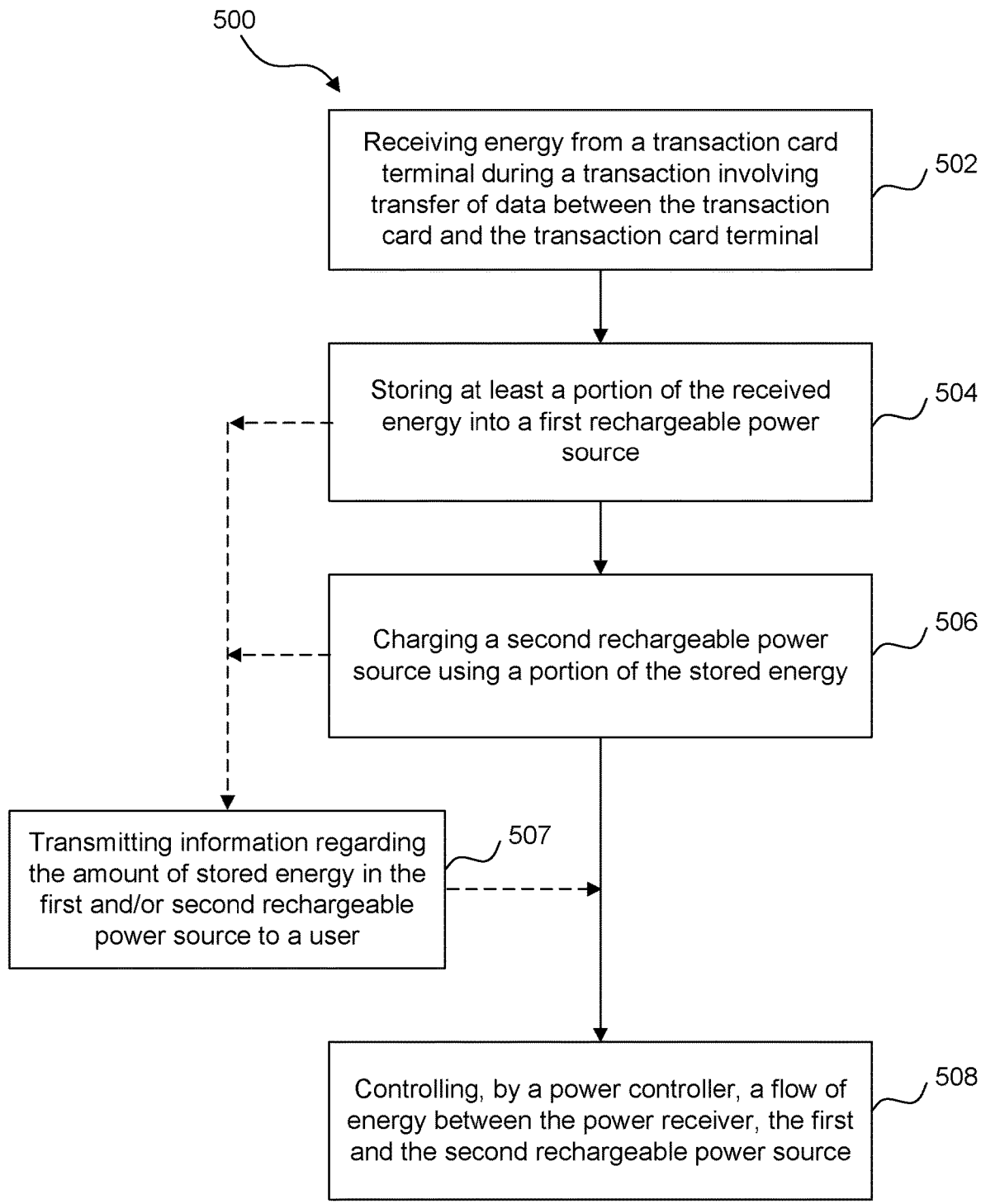
FIG. 5 is a flow chart illustrating an exemplary method of hybrid energy harvesting for charging the transaction card, consistent with disclosed embodiments.

One aspect of the present disclosure is directed to a method of hybrid energy harvesting for charging a transaction card (e.g., transaction card 140, shown in FIG. 1) consistent with disclosed embodiments. FIG. 5 is a process flowchart illustrating an exemplary method 500 of hybrid energy harvesting for charging a transaction card in accordance with disclosed embodiments. The order and arrangement of steps in the process are provided for purposes of illustration. As will be appreciated from this disclosure, modifications may be made to the process by, for example, adding, combining, removing, and/or rearranging the steps for the process.

A first step 502 includes receiving charging energy by a power receiver (e.g., power receiver 210, as shown in FIG. 3) from a transaction card terminal (e.g., ATM 410, as shown in FIG. 4) during a transaction. In some embodiments, charging energy may be received by the power receiver upon interaction of the transaction card with the transaction card terminal.

In a contact mode interaction, at least a portion of the transaction card may be in physical contact with a transaction card terminal. For example, inserting the transaction card into a receiving slot of a transaction card terminal such that a transaction component, for example, an EMV chip may be in contact with the internal circuitry of the transaction card terminal. Other examples of contact mode interaction may include swiping the transaction card, placing the transaction card on a sensor pad, etc.

In a non-contact mode interaction, the transaction card may receive charging energy from a transaction card terminal through electromagnetic inductive charging, for example. The transaction card may be placed in proximity to the transaction card terminal such that the charging energy can be wirelessly received by the power receiver or an antenna (e.g., receiver coil 310, shown in FIG. 3) of the transaction card.

In some embodiments, the transaction card terminal may comprise a signal transmitter configured to transmit magnetic waves, received by a signal receiver (e.g., receiver coil 310) of the transaction card. The electromagnetic field generated by the incoming signal (magnetic waves) may create a flow of charge within the receiver coil of the power receiver.

In step 504, at least a portion of the received charging energy may be stored into a primary rechargeable power source (e.g., primary rechargeable power source 330, shown in FIG. 3). In some embodiments, the primary rechargeable power source may be a supercapacitor, such as, for example, an electric double-layer capacitor. The primary rechargeable power source may be configured to be rapidly charged or recharged from the received charging energy of the power receiver.

In some embodiments, the received charging energy may be transferred from the power receiver to the primary rechargeable power source through a wired connection, for example, connection 420, shown in FIG. 4). The received charging energy may be transferred wirelessly as well.

In step 506, a secondary rechargeable power source (e.g., secondary rechargeable power source 350, shown in FIG. 3) may be charged using at least a portion of the stored charging energy in the primary rechargeable power source. In some embodiments, the frequency and duration of charging or recharging the secondary power source may be determined based on the power requirements of the transaction card.

In some embodiments, the secondary rechargeable power source may comprise a lithium-ion battery, for example. Other suitable power sources may be used as well.

In step 508, a power controller (e.g., power controller 340 of FIG. 3) may be configured to control the flow of charging energy between the power receiver, primary rechargeable power source and the secondary rechargeable power source. In some embodiments, controlling the flow of charging energy may include determining the required amount of charging energy. For example, during a transaction more power may be required to operate the components associated with communicating with a network (e.g., network 130 of FIG. 1) or a bank (e.g., financial service provider system 110 of FIG. 1). In some embodiments, as shown in step 507, process 500 may further include transmitting information regarding the amount of stored energy in the first and/or second rechargeable power source to a user through a NFC-enabled device associated with the user, as described above with respect to FIG. 3.

In addition, the power controller may be configured to allow charging energy to flow only from the power receiver to the primary rechargeable power source and may control the direction and amount of charging energy flowing from the primary rechargeable power source to the secondary rechargeable power source.

The foregoing descriptions have been presented for purposes of illustration and description. They are not exhaustive and are not limited to the precise forms or embodiments disclosed. Modifications and adaptations will be apparent to those skilled in the art from consideration of the specification and practice of the disclosed embodiments. For example, the described implementation includes software, but embodiments of the disclosure may be implemented as a combination of hardware and software or in hardware alone.

Other embodiments of the invention will be apparent to those skilled in the art from consideration of the specification and practice of the embodiments disclosed herein. The specification and examples should be considered as exemplary only, with a true scope and spirit of the disclosure being indicated by the following claims.

What is claimed is:

1. A transaction card, comprising:
a data storage device configured to supply account information to a transaction card terminal;
a first rechargeable power source configured to receive charging energy from the transaction card terminal during a transaction using the card;
a second rechargeable power source configured to receive energy from the first rechargeable power source; and a power controller configured to:
  determine, in response to a request associated with the transaction, that the transaction card has sufficient power to complete the transaction prior to initiating the transaction; and
  transmit, to an external device, an indication of an amount of energy stored in at least one of the first or second rechargeable power sources.

2. The transaction card of claim 1, wherein the first rechargeable power source is configured to receive energy upon interaction of the card with the transaction card terminal.

3. The transaction card of claim 1, wherein the data storage device comprises one of a contact mode output component or a non-contact mode component.

4. The transaction card of claim 1, wherein the first rechargeable power source is configured to receive energy through at least one of electromagnetic induction, inductive coupling, or resonant inductive coupling.

5. The transaction card of claim 1, wherein the first rechargeable power source comprises at least one of an electric double-layer capacitor, a pseudocapacitor, or a hybrid capacitor.

6. The transaction card of claim 1, wherein the second rechargeable power source is configured to receive energy during periods other than when the transaction is occurring.

7. The transaction card of claim 1, wherein the second rechargeable power source comprises at least one of a lithium-ion battery, an alkaline battery, or a nickel-metal hydride battery.

8. The transaction card of claim 1, wherein the power controller is further configured to control a flow of energy between the transaction card terminal and the first rechargeable power source.

9. The transaction card of claim 1, wherein the power controller comprises at least one of a power management integrated circuit, a microprocessor, a power management unit, or an application-specific integrated circuit.

10. The transaction card of claim 1, wherein the external device is a mobile device associated with the transaction card.

11. A method of managing power in a transaction card, the method comprising:
  receiving, at a power module, energy from a transaction card terminal during a transaction;
  storing, by the power module, at least a portion of the received energy in a first rechargeable power source;
  charging, by the power module, a second rechargeable power source using at least a portion of the stored energy;
  exchanging, by a transaction module, transaction information with the transaction card terminal;
  determining, in response to a request associated with the transaction, whether the transaction card has sufficient power to complete the transaction prior to initiating the transaction; and
  transmitting, to an external device, an indication of an amount of energy stored in at least one of the first or second rechargeable power sources.

12. The method of claim 11, wherein receiving energy from the transaction card terminal comprises receiving energy through at least one of electromagnetic induction, inductive coupling, or resonant inductive coupling.

13. The method of claim 11, wherein storing at least a portion of the received energy comprises storing energy in at least one of an electric double-layer capacitor, a pseudocapacitor, or a hybrid capacitor.

14. The method of claim 11, wherein the second rechargeable power source is charged during periods other than when the transaction is occurring.

15. The method of claim 11, wherein charging the second rechargeable power source comprises charging at least one of a lithium-ion battery, an alkaline battery, or a nickel-metal hydride battery.

16. The method of claim 11, wherein the method further comprises controlling, by the power module, a flow of energy between the transaction card terminal and the first rechargeable power source.

17. The method of claim 11, wherein the method further comprises controlling, by the power module, first and second rechargeable power sources.

18. The method of claim 11, wherein transmitting the indication comprises transmitting the indication to a mobile device of a user associated with the transaction card.

19. The method of claim 11, wherein transmitting the indication comprises transmitting the indication using a wireless protocol.

* * * * *